March 21, 1950  J. C. REESE  2,501,004
FLUID PRESSURE OPERATED OIL MEASURING SYSTEM
Filed May 31, 1946  2 Sheets-Sheet 1
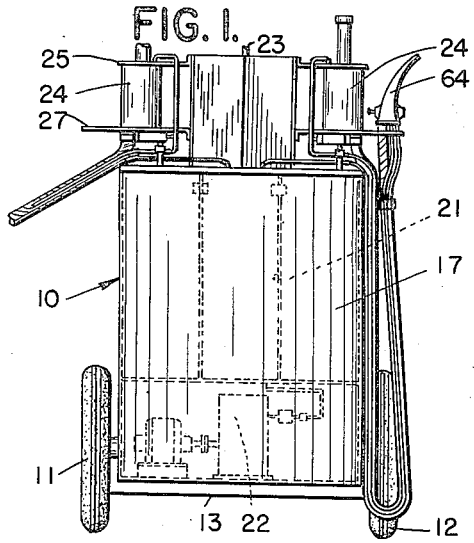
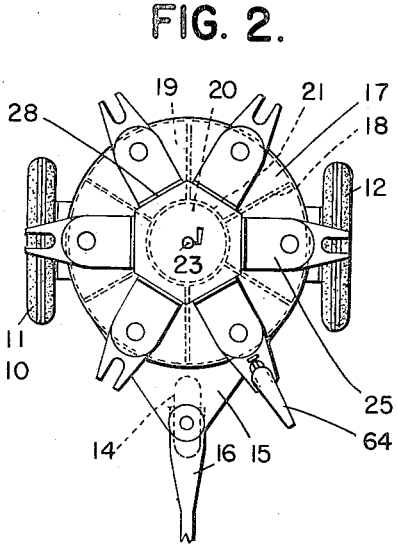
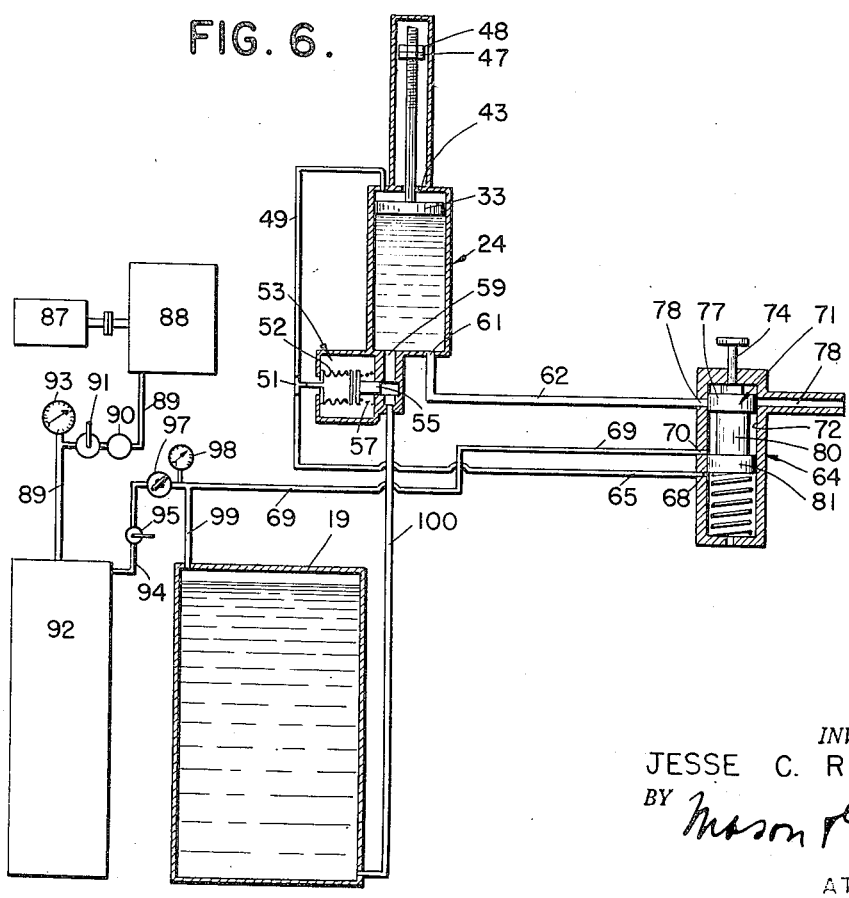
*INVENTOR.*
JESSE C. REESE
BY Mason Graham
ATTORNEYS March 21, 1950     J. C. REESE     2,501,004
FLUID PRESSURE OPERATED OIL MEASURING SYSTEM Filed May 31, 1946     2 Sheets-Sheet 2

INVENTOR.
JESSE C. REESE
BY Mason & Graham
ATTORNEYS

Patented Mar. 21, 1950

2,501,004

UNITED STATES PATENT OFFICE 2,501,004

FLUID PRESSURE OPERATED OIL MEASURING SYSTEM

Jesse C. Reese, Los Angeles, Calif.

Application May 31, 1946, Serial No. 673,498

7 Claims. (Cl. 222—263)

The present invention relates to an oil dispenser and oil dispensing system, and more particularly to an arrangement and method for dispensing measured quantities of oil in the manner required for use in motor vehicles and aircraft.

Various types of pumps and measuring dispensing devices have been developed for dispensing gasoline and other liquids. None, however, has been generally adopted for the dispensing of lubricating oils in filling stations and for airports servicing small aircraft. For this reason, it is common practice to dispense lubricating oil for use in motor vehicles and small aircraft from measured containers such as quart measuring cans or bottles. This method has numerous recognized disadvantages, and up to the present time has presented a problem to which no entirely satisfactory answer was available.

An object of the present invention is to make an improved and simplified lubricating oil dispenser.

Another object is to make an improved and accurate metering dispenser for lubricating oil.

Another object is to employ compressed air to control the actuation of a novel oil metering dispensing device.

Another object is to provide a remote control for the operation of a dispensing device for lubricating oils.

Another object is to arrange for the dispensing of any selected one of a plurality of lubricating oils at a point removed from a plural reservoir containing such oils.

These and other objects and advantages of the invention will be more fully set forth in the following description and in the accompanying drawings, of which there are two sheets.

In the drawings:

Fig. 1 is a view in side elevation of an oil dispensing cart having a plurality of oil metering dispensers embodying the present invention mounted thereon, two of the dispensers being removed for the purpose of clarifying the drawing;

Fig. 2 is a plan view of the device shown in Fig. 1 with but one oil dispensing hose connected thereto;

Fig. 6 is a diagrammatic view illustrating the operative association of the various parts comprising the system.

Figure 3:
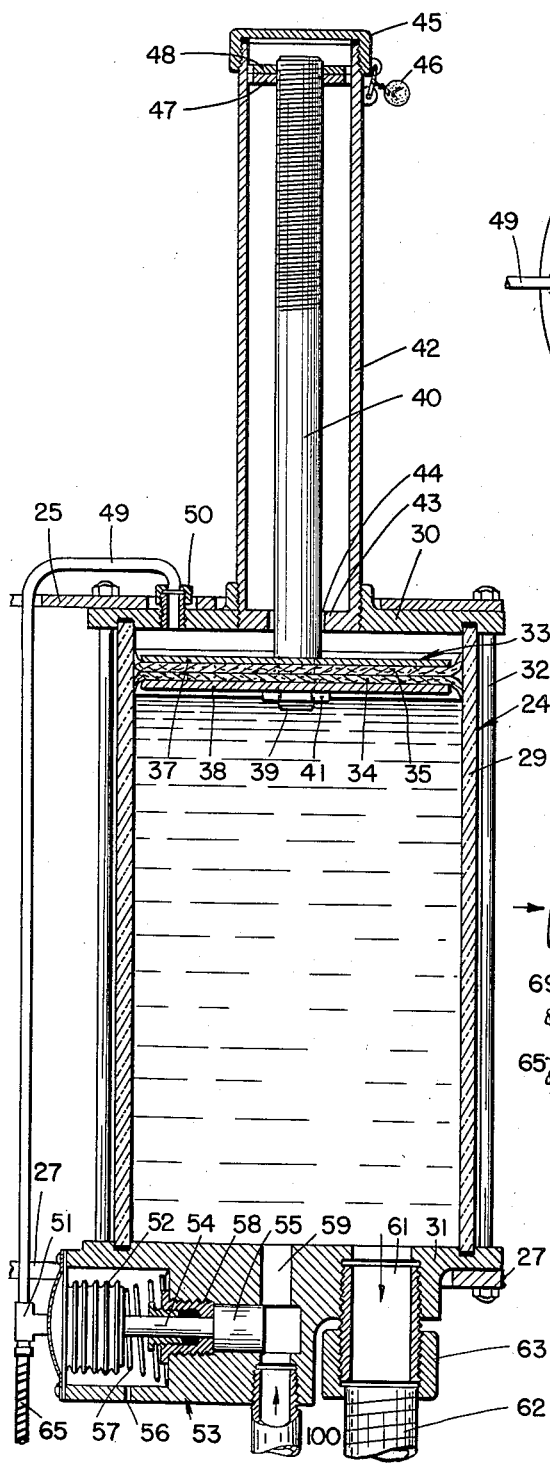
Fig. 3 is a fragmentary vertical sectional view through one of the dispensing units embodied in the structure illustrated in Figs. 1 and 2.
Figure 4:
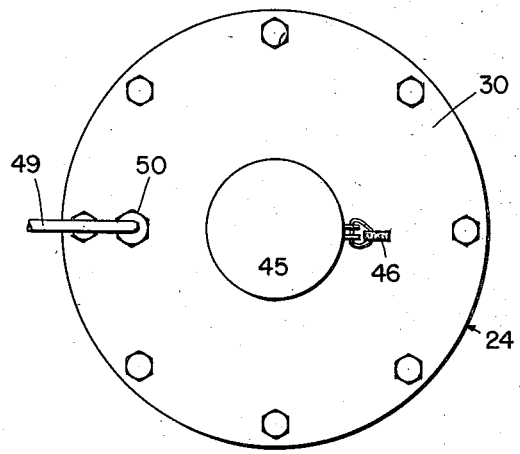
Fig. 4 is a plan view of the unit shown in Fig. 3.

Referring to the drawings in detail, a cart 10 is mounted on a pair of main supporting wheels 11 and 12, which, in turn, are journaled on a U-shaped axle 13. A steerable wheel 14 is pivoted to a forwardly extending frame portion 15. A towing handle 16 is secured to the steerable wheel and may be used for transporting the device.

A body or tank portion 17 has a plurality of division walls 18 therein to divide the interior of the main tank body portion into a plurality of reservoirs 19. Each of these reservoirs is adapted to contain a quantity of lubricating oil. The type and specific gravity of the oil in each reservoir preferably is displayed on the segment of the body of the device which is occupied by the reservoir.

A central compartment 20 may comprise a compressed air tank adapted to contain compressed air at pressures of between one and two hundred pounds, such as is available from the air compressors of most filling stations. If desired, a separate motor driven compressor 22 may be mounted to furnish compressed air to the tank or the air tank 21 may be omitted entirely, and a connection 23 may be provided whereby the device may be connected directly to the usual compressed air supply of a filling station in which the device is to be used.

A plurality of oil dispensing units 24 are supported on brackets 25 and 27 mounted on a central hexagonal support 28 which in turn is mounted on top of the body portion 17. Since the oil dispensing units 24 are all alike, one only of these units will be described.

The dispensing unit comprises a cylinder 29, which may be of glass, for displaying the oil to be dispensed, and also to permit the customer to observe that a full stroke of the pump is accomplished on each operation of the device. The cylinder 29 is held in compression between a top plate 30 and a bottom plate 31, these plates being drawn into sealing engagement with the upper and lower edges of the glass cylinder 29 by bolts 32, of which eight are employed in the structure illustrated.

A piston assembly 33 comprises two oppositely disposed sealing cups or washers 34 and 35 which are held between two rigid metal discs 37 and 38. The piston assembly 33 is mounted on a reduced end portion 39 of a rod 40, being secured in position thereon by a retaining nut 41. The piston rod 40 is encased in a tubular housing 42 threaded into the cylinder top plate 30. A stop plate 43 is mounted in the lower end of the rod housing 42 and has a central opening 44 therein of a size to permit the piston rod 40 to reciprocate freely therein.

The connection between the tubular rod housing 42 and the cylinder top plate 30 may be permanently sealed, as by brazing or flowing silver solder into the joint between the top plate 30 and the housing 42. A cap 45 is threaded onto the top of the rod housing 42 and is sealed thereon, as by means of a lead seal 46, of the type used by the departments of weights and measures of many States to seal scales and metering pumps after testing for accuracy.

An adjustable stroke-limiting stop nut 47 is threaded onto the upper end of the piston rod 40, and a lock nut 48 is threaded onto the rod 40 above the stop nut 47 to lock the stop nut in adjusted position. The stop nut 47 is adapted to engage the stop plate 43 in the lower end of the rod housing 42 to limit the downward stroke of the piston. When once adjusted to deliver a required quantity of lubricating oil, the stop nut 47 is locked in adjusted position by the lock nut 48. Thereafter the threaded cap 45 is screwed on and is sealed in position on the housing 42 by means of the seal 46.

A tube 49 for compressed air opens into the interior of the cylinder 24 through a compression fitting 50 threaded into an opening in the top plate 30, as best illustrated in Fig. 3. A T-fitting 51 is provided in the compressed air tube 49, the lateral outlet of which fitting opens into an actuating bellows 52 of an air operated valve 53. The body of the valve 53, as here illustrated, is cast integrally with the bottom plate 31 of the dispensing cylinder. The valve 53 is mounted to control the flow of oil through an oil inlet passage 59 into the interior of the dispensing unit 24.

The air bellows 52 of the valve 53 is connected to the stem 54 of a valve plunger 55. A coil spring 57 normally holds the plunger 55 outwardly in the open position illustrated in Fig. 3. Upon a predetermined increase in pressure within the bellows 52, the valve plunger 55 is moved to the right from the position illustrated in Fig. 3 to close the valve. A packing gland 58 seals the stem 54 of the valve against the escape of oil, and a hole 56 maintains the pressure around the bellows 52 at atmospheric during expansion and contraction of the bellows.

The oil inlet passage 59 is in communication, by means of a tube 100, with a supply of oil under pressure in the oil tank or compartment 19 which the dispenser is adapted to serve. An oil dispensing passage 61 is provided through the bottom plate 31 of the cylinder, and a flexible oil dispensing tube 62 is connected into this opening by a fitting 63.

Figure 5:
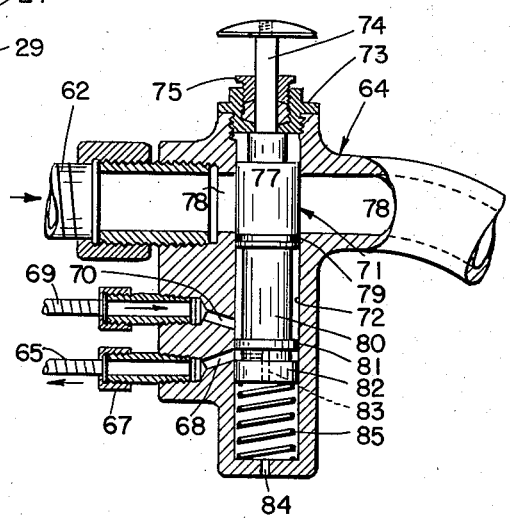
Fig. 5 is an enlarged fragmentary sectional view through a dispensing nozzle with a remote control dispensing valve incorporated therein, and associated tubular connections.

A dispensing nozzle 64, illustrated in Fig. 5, is connected to the other end of the oil dispensing tube 62.

A small flexible tube 65 from the T-fitting 51 of the compressed air tube 49 in Fig. 3 is connected to a compression fitting 67 threaded into a passage 68 in the nozzle. A second flexible tube 69 is connected from a supply of compressed air to a second passage 70 opening into a central cavity 72 in the nozzle above the passage 68. The smaller hoses or tubes 65 and 69 preferably are molded or otherwise secured to the oil dispensing hose 62 throughout the major portion of its length so that all three hoses can be handled as a single flexible hose unit.

A valve plunger 71 is mounted for reciprocating movement in the cylindrical cavity 72 in the nozzle body, the plunger being retained in position therein by means of a nut 73 through which a valve stem 74 is mounted for reciprocating movement. A packing nut 75 is mounted in the nut 73 to seal the stem 74 against the escape of lubricant. A coil spring 85 is held in compression between the lower end of the plunger 71 and the bottom of the cavity 72, normally to hold the plunger upwardly in the closed position shown in Fig. 5.

The valve plunger has a large cylindrical portion 77 mounted to seal an oil dispensing passage 78 through the nozzle. A hydraulic sealing ring 79 may be mounted in a groove around the lower end of the large plunger portion 77 to have sealing engagement with the wall of the recess 72 below the oil dispensing passage 78.

The valve plunger 71 has a portion 80 of reduced diameter below the large portion 77, the reduced portion 80 being of a length, and so located, as always to remain in communication with the upper air passage 70 during a full operative stroke of the plunger. The plunger has an annular piston portion 81 of the same diameter as the large portion 77. The piston 81 in the normal or closed position of the valve is located between the compressed air passages 68 and 70.

A second piston portion 82, of the same diameter as the first, may be provided below the lower compressed air passage 68. The space between the pistons 81 and 82 is approximately the diameter of the passage 68. Thus when the valve plunger 77 is in the normal unoperated position illustrated in Fig. 5, air under compression from the tube 69 is sealed off from the oil passage 78 by the sealing ring 79, and from the lower passage 68 by the piston 81.

From the reduced portion of the valve plunger between the pistons 81 and 82, a bleed orifice 83 is provided into the body of the plunger and through the lower end thereof. A hole 84 is provided in the bottom of the valve recess 72 in the nozzle body so that in the closed position of the valve the lower air passage 68 is open to the atmosphere through the bleed opening 83 and this lower hole 84.

On depressing the plunger 71 of the valve, the large portion 77 of the valve is moved downwardly to open the oil dispensing passage 78 through the nozzle. The compressed air passages 68 and 70, by this same movement of the plunger, are connected, since both then register with the reduced portion 80 of the plunger.

The operation of the device is best illustrated in connection with the diagrammatic illustration of Fig. 6. In addition to the compressed air and oil tubes which already have been described, and which retain their same numerical designations in the diagrammatic illustration of Fig. 6, the following equipment is indicated. A motor 87 has driving connection with an air compressor 88. The compressor is connected by a pipe 89, through a pressure limiting valve 90 and shut-off valve 91 to a compressed air tank 92. A pressure gauge 93 is indicated as connected to the pipe 89.

From the compressed air tank 92 a pipe 94 is connected through a shut-off valve 95 and a pressure limiting valve 97 to the flexible tube 69 which is connected to open into the nozzle 64 above the plunger piston 81.

A pressure gauge 98 is illustrated as connected to the pipe 94. A branch airline 99 from the pipe 94 is connected to open into the upper end of the oil tank 19. From the lower end of the oil tank the tube 100 is connected to open into the dispensing cylinder 24 through the air-valve controlled oil inlet passage 59. The air pressure into the line 99 and into the flexible tube 69 is reduced by the pressure reducing valve 97 to approximately five pounds.

The operation of the device is as follows. We may assume, for the purpose of illustration, that a supply of compressed air is available in the tank 92, the valve 95 is open, and the pressure control valve 97 is adjusted to provide a required pressure in the oil reservoir 19 and at the nozzle 64, of approximately five pounds per square inch. Also, that the effective stroke of the piston 33 has been regulated by adjustment of the nut 47 to deliver a required quantity of oil at each stroke of the pump, and that the nut 47 has been secured in adjusted position by the lock nut 48.

To operate the device the operator takes the nozzle 64, as illustrated in Fig. 1, and inserts the discharge end of the nozzle into an oil filling opening through which the oil is to be delivered, for example, into an automobile engine, not shown. The operator then depresses the valve stem 74, moving the valve plunger 71 downward from the position illustrated in Fig. 5. This opens the oil discharge passage 78 through the nozzle by moving the enlarged portion 77 of the plunger downwardly. Simultaneously the piston 81 is moved downwardly below the lower air passage 68.

The passage 70 thus is brought into open communication with the passage 68 through the space between the wall of the cavity 72 and the reduced plunger portion 80. Compressed air thereupon will flow from the tank 92 through the pipe 94, through the open valve 95 and through the pressure reducing valve 97, where the air pressure is reduced to approximately five pounds per square inch. Thence the air flows through the flexible tube 69, through the passage 70 into the nozzle. Thence the air flows outwardly through the passage 68 and the tube 65 to the T-fitting 51. Here the increased air pressure is transmitted to the bellows 52, which is expanded thereby and moves the valve member 55 inwardly, thereby closing the oil inlet passage 59. The increased air pressure simultaneously is transmitted through the tube 49 into the upper end of the cylinder above the piston 33. This increase of pressure above the piston moves the piston downwardly, forcing the oil in the cylinder outwardly through the oil outlet 61, and thence through the dispensing hose 62 and out the nozzle discharge passage 78.

On completion of an effective stroke of the piston, as limited by the stop nut 47 engaging the stop plate 43, the plunger 71 is released by the operator and is returned to the normal closed position illustrated in Fig. 5 by the compression spring 85. Upon return to normal, compressed air in the passage 70 is sealed off from the passage 68 by the piston 81. The passage 68, in this raised position of the plunger, is open to the atmosphere through the bleed orifice 83 and the opening 84. The bellows 52 and the interior of the cylinder 24 above the piston 33 thus are restored to atmospheric pressure. This restoration to atmospheric pressure permits the valve 55 to open by the action of the coil spring 57.

Since the oil in the reservoir 19 is under constant pressure from the branch compressed air line 99, as soon as the valve 55 is opened and the pressure above the piston 33 returns to atmospheric, oil will flow from the oil reservoir 19 through the line 100 and thence through the oil inlet 59 into the interior of the cylinder. This action of the oil forces the piston 33 upwardly to the upper limit of its stroke, refilling the dispensing unit 24 and placing it in readiness for another dispensing operation as required.

While I have illustrated and described a preferred embodiment of my invention, it will be apparent to those familiar with the art that the device is capable of several modifications, some of which have been set forth above, without departing from the spirit and scope of the invention. It is, therefore, desired not to limit the invention except as defined in the following claims.

I claim:

1. An oil metering dispenser comprising a metering cylinder, a piston operatively mounted in said cylinder, adjustable stop means mounted to limit the stroke of said piston, a supply of oil under pressure open to the interior of said cylinder on one side of said piston, an oil discharge line open to said cylinder on the same side of said piston as said oil inlet, a control valve mounted in the oil discharge line, air actuated control means mounted simultaneously to close said oil inlet and apply air pressure to the side of said piston opposite to the opening to said oil discharge line on an operation of said air actuated control means, and means operatively interconnecting the oil discharge control valve and said air operated means.

2. An oil metering dispenser comprising a metering cylinder, a piston operatively mounted in said cylinder, adjustable stop means mounted to limit the stroke of said piston, a supply of oil under pressure open to the interior of said cylinder on one side of said piston, an oil discharge line open to said cylinder on the same side of said piston as said oil inlet, air operated control means mounted simultaneously to close said oil inlet and apply air pressure to the side of said piston opposite to the opening to said oil discharge line on an operation of said air operated control means, a dispensing nozzle having flexible tubular connection with said oil discharge line and with said air operated control means, said nozzle having valve means mounted therein to control the oil discharge line and said air operated control means.

3. An oil metering dispenser comprising a supply of oil under pressure, a dispensing unit comprising a metering cylinder normally openly connected to said oil supply, a normally open air operated valve mounted to control the flow of oil from said oil supply into said cylinder, a piston operatively mounted in said cylinder on one side of the cylinder connection to said oil supply, said cylinder having an oil outlet on the same side of said piston as said connection to the oil supply, said cylinder having an air inlet on the opposite side of said piston from said connection to the oil supply and from said cylinder oil outlet, a supply of compressed air, a nozzle, a valve operatively mounted in said nozzle, and a plurality of flexible hose members connecting said compressed air supply, the cylinder air inlet, the air operated valve, and the cylinder oil outlet, to said nozzle, said nozzle valve having a normal position closing the passage from said cylinder oil outlet, and separating the compressed air supply from said cylinder air inlet and said air operated valve, said nozzle valve having an operated position opening the passage from said cylinder oil outlet and connecting the compressed air supply to said cylinder air inlet and to said air operated valve, thereby closing said air operated valve and forcing said piston toward said oil outlet.

4. An oil metering dispenser comprising a supply of oil, a dispensing unit comprising a metering cylinder normally openly connected to said oil supply, a normally open air operated valve mounted to control the flow of oil from said oil supply into said cylinder, a piston operatively mounted in said cylinder on one side of the cylinder connection to said oil supply, said cylinder having an oil outlet on the same side of said piston as said connection to the oil supply, said cylinder having an air inlet on the opposite side of said piston from said connection to the oil supply and said oil outlet, a supply of compressed air, means openly connecting the compressed air supply to the oil supply, a nozzle, a valve operatively mounted in said nozzle, a plurality of flexible tubular members secured together throughout a major portion of their lengths for handling as a single flexible hose connecting said compressed air supply, the cylinder air inlet, the air operated valve, and the cylinder oil outlet, to said nozzle, said nozzle valve having a normal position closing the passage from said cylinder oil outlet and separating the compressed air supply from said cylinder air inlet and said air operated valve, said nozzle valve having an operated position opening the passage from said cylinder oil outlet and connecting the compressed air supply to said cylinder air inlet and to said air operated valve, thereby closing said air operated valve and forcing said piston toward said oil outlet.

5. An oil metering dispenser comprising a base, an oil reservoir mounted on said base, a metering cylinder mounted on said reservoir and normally openly connected to said oil reservoir, a normally open air operated valve mounted on said cylinder to control the flow of oil from said oil reservoir into said cylinder, a free piston operatively mounted in said cylinder on one side of the cylinder connection to said oil reservoir, said cylinder having an oil outlet on the same side of said piston as said connection to the oil reservoir, said cylinder having an air inlet on the opposite side of said piston from said connection to the oil reservoir and from said cylinder oil outlet, a compressed air line carried by said base, and connected to said oil reservoir, a nozzle, a valve operatively mounted in said nozzle, a plurality of flexible tubular members connecting said compressed air line, the cylinder air inlet, the air operated valve, and the cylinder oil outlet, to said nozzle, said nozzle valve having a normal position closing the passage from said cylinder oil outlet, and separating the compressed air line from said cylinder air inlet and said air operated valve, said nozzle valve having an operated position opening the passage from said cylinder oil outlet and connecting the compressed air line to said cylinder air inlet and to said air operated valve, thereby closing said air operated valve and forcing said piston toward said oil outlet.

6. An oil metering dispenser comprising a cylinder having air and an oil inlet and outlet, a piston operatively mounted for free reciprocation in said cylinder, a dispensing nozzle, a multiple control valve, a supply of compressed air, a plurality of conduits connecting said supply of compressed air, the cylinder air inlet, and the cylinder oil outlet, through said multiple control valve, to said nozzle, said control valve normally closing the conduit connecting said cylinder oil outlet to the nozzle, said valve also normally separating the conduit connecting the supply of compressed air to the nozzle from the conduit connecting said cylinder air inlet to the nozzle, said valve being operable simultaneously to open the conduit connecting said cylinder oil outlet to the nozzle, and to connect the supply of compressed air into the conduit from said cylinder air inlet to the nozzle.

7. An oil metering dispenser comprising a wheel supported base, an oil reservoir mounted thereon, a cylinder mounted on said reservoir, said cylinder having an inlet and an outlet, a piston operatively mounted in said cylinder, a dispensing nozzle, a multiple control valve, a supply of compressed air connected to said oil reservoir, flexible conduits connecting said supply of compressed air, the cylinder inlet, and the cylinder outlet, to said nozzle, said flexible conduits being secured together to form a unitary hoselike member, said control valve normally closing the conduit connecting said cylinder outlet to the nozzle, said valve also normally separating the conduit connecting the supply of compressed air to the nozzle from the conduit connecting said cylinder inlet to the nozzle, said valve being operable simultaneously to open the conduit connecting said cylinder outlet to the nozzle, and to connect the supply of compressed air into the conduit from said cylinder inlet to the nozzle.

JESSE C. REESE.

REFERENCES CITED

The following references are of record in the file of this patent:

UNITED STATES PATENTS

| Number | Name | Date |
|---|---|---|
| 1,581,298 | Schotthoefer | Apr. 20, 1926 |
| 1,601,490 | Barks | Sept. 28, 1926 |
| 1,802,324 | Bartlett | Apr. 28, 1931 |
| 1,969,404 | Hunter | Aug. 7, 1934 |